United States Patent
Fahrenkopf et al.

(10) Patent No.: US 11,073,804 B2
(45) Date of Patent: Jul. 27, 2021

(54) INTERFACE BETWEEN PROCESSING ENVIRONMENT OPTIMIZATION LAYERS

(71) Applicant: ExxonMobil Research and Engineering Company, Annandale, NJ (US)

(72) Inventors: Max A. Fahrenkopf, Palo Alto, CA (US); William P. Snow, Charlottesville, VA (US); Ivan E. Rodriguez Colon, Houston, TX (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 175 days.

(21) Appl. No.: 16/150,451

(22) Filed: Oct. 3, 2018

(65) Prior Publication Data

US 2019/0137955 A1 May 9, 2019

Related U.S. Application Data

(60) Provisional application No. 62/582,581, filed on Nov. 7, 2017.

(51) Int. Cl.
G05B 13/04 (2006.01)
G05B 17/02 (2006.01)
(Continued)

(52) U.S. Cl.
CPC ......... G05B 13/042 (2013.01); G05B 13/048 (2013.01); G05B 17/02 (2013.01);
(Continued)

(58) Field of Classification Search
CPC .... G05B 13/042; G05B 13/048; G05B 17/02; G06F 17/11; G06F 17/15; G06N 5/003; G06N 7/08
See application file for complete search history.

(56) References Cited

U.S. PATENT DOCUMENTS 8,145,672 B2 * 3/2012 Kumaran ............. G06K 9/6262
707/791
8,620,705 B2 12/2013 Peterson et al.
(Continued)

OTHER PUBLICATIONS

The International Search Report and Written Opinion of PCT/US2018/056249 dated Jan. 11, 2019.

*Primary Examiner* — Michael J Huntley
(74) *Attorney, Agent, or Firm* — Amanda K. Norwood; Glenn T. Barrett

(57) ABSTRACT

Systems and methods are provided for interfacing multiple layers of optimization for a model of one or more processes in a processing environment to achieve increased or maximized stability in the underlying layer. To improve consistency between the solutions at the different model levels, the lower level of optimization can have extra constraints added to the optimization problem which target variables at their unconstrained values in the upper layer of optimization. The systems and methods can facilitate selection of variables to receive an external target such that stability of the solution is improved or maximized. This can be achieved, at least in part, by identifying variables that provide a reduced or minimized condition number for a sub-matrix in the lower level model when an additional external constraint is applied. The sub-matrix with the reduced or minimized condition number can correspond to a partitioned portion of the gain matrix that corresponds to unconstrained independent variables and constrained dependent variables.

17 Claims, 3 Drawing Sheets

(51) Int. Cl.
*G06F 17/15* (2006.01)
*G06N 7/08* (2006.01)
*G06F 17/11* (2006.01)
*G06N 5/00* (2006.01)

(52) U.S. Cl.
CPC .............. *G06F 17/11* (2013.01); *G06F 17/15* (2013.01); *G06N 5/003* (2013.01); *G06N 7/08* (2013.01)

(56) References Cited

U.S. PATENT DOCUMENTS

| | | | |
|---|---|---|---|
| 2004/0049295 A1 | 3/2004 | Wojsznis et al. | |
| 2004/0249481 A1* | 12/2004 | Zheng | G05B 17/02 700/44 |
| 2007/0168057 A1* | 7/2007 | Blevins | G05B 13/022 700/53 |
| 2008/0077257 A1* | 3/2008 | Peterson | G05B 13/048 700/34 |
| 2010/0212909 A1* | 8/2010 | Baumstein | G01V 1/28 166/369 |
| 2012/0071991 A1* | 3/2012 | Peterson | G06Q 10/04 700/29 |
| 2016/0357166 A1* | 12/2016 | Rehor | G05B 17/02 |
| 2018/0081349 A1* | 3/2018 | Lu | G05B 23/0254 |
| 2019/0064754 A1* | 2/2019 | Backstrom | D21G 9/0009 |

* cited by examiner

INTERFACE BETWEEN PROCESSING ENVIRONMENT OPTIMIZATION LAYERS

CROSS-REFERENCE TO RELATED APPLICATIONS

This application claims the benefit of U.S. Provisional Application No. 62/582,581, filed on Nov. 7, 2017, the entire contents of which are incorporated herein by reference.

FIELD

This invention relates to systems and methods for improving the stability of the interface between optimization layers in an optimization system for processing environment control.

BACKGROUND

Modern processing plants often have many different layers of optimization, which can include Model Predictive Control, Real-Time Optimization, Planning and Scheduling. Model Predictive Control (MPC) are a class of algorithms that use a simplified dynamic model to predict the dependent variables (i.e., outputs) of a dynamical system with respect to changes in the process independent variables (i.e., inputs), and to move the process independent variables in a more optimal fashion. The steady-state targets for the independent variables are often determined by an economic objective function. Frequency of execution is on the order of minutes or seconds.

Real-time optimization (RTO) are a class of algorithms that se more rigorous process models and economics to find more complicated optima which are difficult or impossible to find using the simplified models from Model Predictive Control. Usually, the economics are updated more regularly than MPC. Frequency of execution is on the order of hours.

Scheduling programs use a model of the process facility to represent individual unit capabilities, capacities and constraints. An optimizer is used to calculate the timing and disposition of available feeds and products. Frequency of execution is on the order of days or weeks.

Planning programs use a model of a process facility, or even multiple processing facilities, to represent production capabilities and constraints. An optimizer is used to calculate optimal feedstock procurement, sales strategy and facilities' utilization. Frequency of execution is on the order of weeks or months.

In general, multiple layers of optimization are used in a hierarchical manner, with results from higher layers sent down as "targets" to lower layers (see FIG. 1). Sometimes shadow values (sensitivity of the economic objective function to changes in constraints) of a higher layer are used to help define the economic objective function(s) of lower layer(s). However, the programs in different optimization layers are usually run by different people, sometimes in different organizations. The models, objective functions and optimization algorithms can be different, even though they contain common variables. Since higher-level optimization programs are executed at lower frequencies, the targets calculated by an upper layer will become further away from the true optimum when there are process changes or disturbances between upper layer execution cycles.

U.S. Pat. No. 8,620,705 describes a method for synchronizing the objective functions of different layers of optimization. Although the method considers economics when synchronizing the objective functions, the method does not address the stability of the system.

SUMMARY

In various aspects, a method for improving performance of a process in a processing environment is provided. The process can correspond to any convenient type of process in a processing environment, such as a process in a refinery, a process in a chemical plant, another type of process associated with production/modification of hydrocarbon-like feeds, or a process from another type of processing environment. The method can include determining a solution for a non-linear model comprising a first set of dependent variables and a first set of independent variables. The non-linear model can correspond to, for example, a higher layer in a multi-layer optimization scheme corresponding to at least a portion of processing environment. The solution for the non-linear model can include at least one constrained variable from the first set of dependent variables and a plurality of unconstrained independent variables from the first set of independent variables. The first set of independent variables can correspond to process control variables for at least one process in the processing environment. At least one dependent variable from a second set of dependent variables can be correlated with the at least one constrained variable from the solution for the non-linear model. The second set of dependent variables can be associated with a linear program model (such as a lower level in the multi-layer optimization scheme) corresponding to the at least one process in the processing environment. In some aspects, correlating the variables can correspond to matching the same type of variable between the non-linear model and the linear program model. A set of costs associated with a second set of dependent variables and the first set of independent variables can be calculated. A gain matrix for the linear program model can then be partitioned. In some instances, this partitioning will result in formation of a non-square sub-matrix comprising the plurality of unconstrained independent variables and the correlated at least one dependent variable. This non-square sub-matrix can be converted into a square sub-matrix based on constraining one or more unconstrained dependent variables from the second set of dependent variables, the plurality of independent variables, or a combination thereof. The converting can include determining, for each of one or more unconstrained dependent variables from the second set of dependent variables, condition numbers for candidate sub-matrices. For example, determining condition numbers can correspond to constraining a selected dependent variable, followed by calculating a condition number for the candidate sub-matrix comprising the constrained selected dependent variable, and then unconstraining the selected dependent variable. If a sufficiently low condition number is determined, the dependent variable with the lowest condition number can be selected for constraint. If none of the condition numbers are below a threshold value, the process can be repeated with the independent variables, so that an independent variable corresponding to the lowest condition number can be selected. This process can be repeated until the square sub-matrix is formed. The linear program model can then be solved based on at least the calculated costs and the converted square sub-matrix. Based on the solving of the linear program model, a process control variable corresponding to at least one unconstrained independent variable from the plurality of unconstrained independent variables can be modified.

In some aspects, the calculated cost values can be calculated at least in part based on the determined solution for the non-linear model. In some aspects, the non-linear model can correspond to a Real-Time Optimization model and/or the linear program model can correspond to a Model Predictive Control model.

DETAILED DESCRIPTION OF THE EMBODIMENTS

Overview

Figure 1:
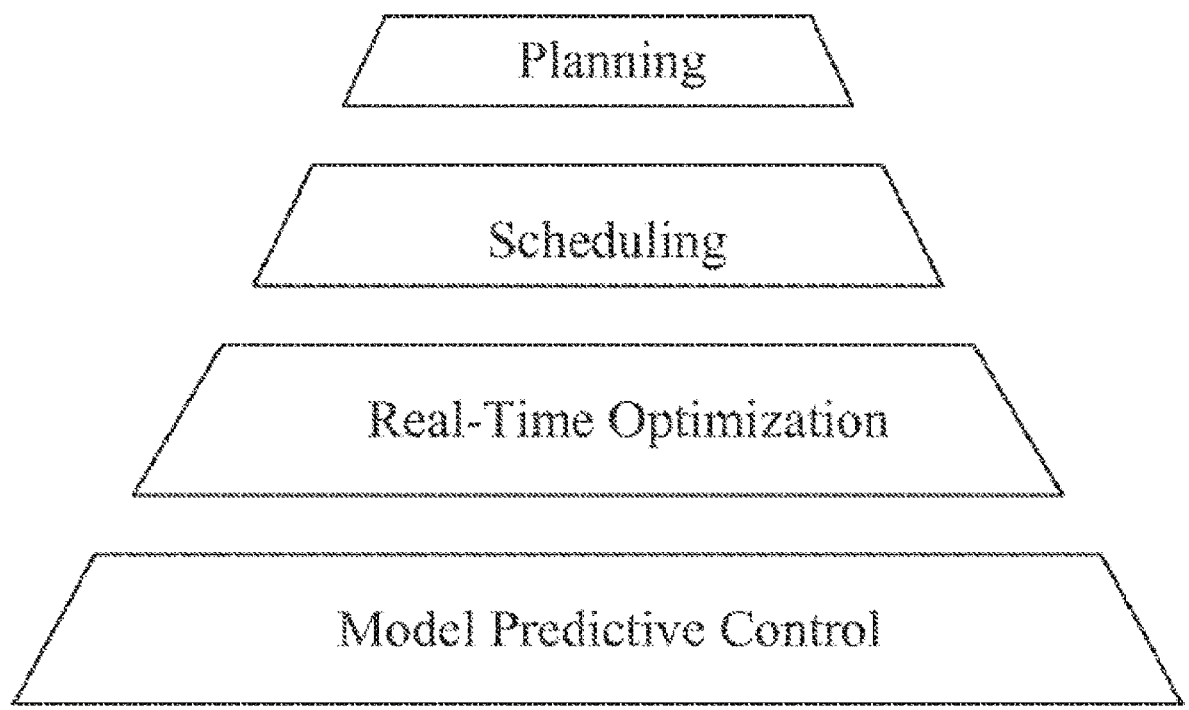
FIG. 1 is a schematic diagram showing the typical hierarchy of Planning, Scheduling, Real-Time Optimization, and Model Predictive Control.

In various aspects, systems and methods are provided for interfacing multiple layers/levels of optimization for a model of one or more processes in a processing environment to achieve increased or maximized stability in the underlying layer. The systems and methods can typically be applied when the lower level has at least as many active constraints as the upper level, such as more constraints than the upper level. To improve consistency between the solutions at the different model levels, the lower level of optimization can have extra constraints added to the optimization problem which target variables at their unconstrained values in the upper layer of optimization. The number of targets used can be equivalent to the number of available/effective degrees of freedom, which corresponds to the difference between the number of independents in the lower layer and the number of active constraints in the upper layers of optimization. The systems and methods can facilitate selection of variables to receive an external target such that stability of the solution is improved or maximized. This can be achieved, at least in part, by identifying variables that provide a reduced or minimized condition number for a sub-matrix in the lower level model when an additional external constraint is applied. The sub-matrix with the reduced or minimized condition number can correspond to a partitioned portion of the gain matrix that corresponds to unconstrained independent variables and constrained dependent variables. Stability in the lower level of optimization means that when the optimization is solved multiple times, the solution does not change significantly due to small changes in model input values. This stability in the model can provide corresponding stability in the independent or manipulated variables controlling the process.

The systems and methods described herein can have the technical effect of allowing for improved operation of various processes in a processing environment (such as refinery processes) when attempting to respond to changes in processing environment conditions. The changes in conditions can correspond to changes caused by a process perturbation somewhere in the processing environment, changes due modification of input feeds or material to the processing environment (such as input crude slates), or any other convenient type of change in the operation. By improving the stability of the interface between optimization layers for operating a processing environment, wide swings in process operation can be avoided. For example, when small changes in variable values result in large changes in the resulting optimization solution, the operating models can end up in a situation where large swings in various independent or manipulated variables are requested each time different operating layers communicate. This can cause instability problems both for achieving the wide swings for individual processes, as well as difficulties for downstream processes that in turn must respond to changes in the outputs from the upstream process experiencing the large operation swings. As an example, a process that is oscillating between two distinct regions for operating temperature and/or input feed flow will have a corresponding impact on downstream processes, which end up receiving effluents of widely ranging temperature and/or volume. The systems and methods described herein can provide an improved interface between optimization layers that reduces or minimizes the likelihood of such process oscillations when attempting to interface the different model layers. This can be achieved, for example, by providing a method for determining which additional variables within a model can be constrained when attempting to synchronize the optimization solutions between the layers. The additional variables for constraint can be selected based on the constraint that results in the lowest condition number for the sub-matrix formed by partitioning the gain matrix.

In this discussion, a processing environment can refer to any convenient type of facility including multiple processes for converting input materials to other types of products. Examples of processing environments can include, but are not limited to, refineries, chemical and/or polymer production plants, manufacturing facilities, water treatment plants (such as desalinization plants), and gas separation facilities. It is noted that a processing environment can potentially include processes at disparate locations. In this discussion, models can be applied to one or more processes within a processing environment. The processes modeled within one layer can differ from the processes modeled in a second layer, so long as one process overlaps to allow for synchronization between the layers. For a processing environment corresponding to a refinery or chemical production plant, examples of processes can include, but are not limited to, a distillation column, a pressurized reactor, a thermal reactor, a catalytic reactor, or a combination thereof. In this discussion, a process control variable can correspond to a variable for a process that can be directly changed. In the corresponding models, process control variables can be represented as independent variables (sometimes referred to as manipulated variables). It is noted that a process control variable, which corresponds to a variable in the real world system that can be directly changed, is distinct from a controlled variable, which corresponds to a dependent variable in a model of a system.

In modern manufacturing facilities, different layers of optimization can be utilized to continuously drive a manufacturing process toward economic optimality while maintaining safe and environmentally sound operations. The different optimization layers differ in scope and execution time. While the top layers of optimization are typically designed to optimize overall plant operations, lower levels of optimization are used for continuous automation and process control. For optimization layers used for process automation, stability is a major concern. An optimization layer is considered to be stable when it limits large moves and holds a process close to steady state. Although stability is straightforward to achieve in each individual optimization layer, the interface between the optimization layers may itself inflict destabilizing effects.

Many manufacturing processes are automated by RTO and MPC. MPC (Model Predictive Control) is an optimization based process control technology which is designed to manipulate multiple inputs to regulate multiple controlled variables while respecting constraints. MPC typically utilizes empirical linear dynamic models which enable rapid computation of the control plan. MPC is typically implemented in two stages. First a linear program (LP) is solved to find the steady-state targets. Next, a quadratic program (QP) is solved to find the dynamic move plan to optimally approach those targets.

Due to process complexities (e.g., nonlinear process relationships) and the limited fidelity of linear models, a large discrepancy can exist between the MPC steady-state targets and true optimal operations of the process. This discrepancy can be largely reduced by implementing Real-Time Optimization (RTO). RTO utilizes more rigorous non-linear process and economic models to identify the optimal process operations. The added complexity comes at the expense of more computational time to solve the optimization problem. RTO is therefore interfaced to MPC using different layers to allow for different execution times. MPC is used to direct a process to operate close to constraints and can simultaneously reject plant disturbances. To perform these functions, MPC typically requires an execution time on the order of a minute or less. RTO is used to direct the MPC toward economically optimal operations and is typically executed every few hours once steady-state has been detected.

Previous interfaces between RTO and MPC have typically focused on economic incentives, model quality, and RTO/MPC model consistency. Information is passed in the form of external targets where the RTO sets targets on variables for the MPC to attempt to achieve. The selection of the external targets is typically ad hoc and does not consider stability as a criterion for properly interfacing the RTO and MPC.

After selecting external targets in the RTO layer, a linear program in the MPC layer can be solved to arrive at an improved or optimal solution. During the solving of the linear program, the matrices can be partitioned and inverted based on the active constraint set, which is based in part on the external targets selected in the RTO layer. The active constraint set then directly influences the condition number of these matrices. In particular, if the active constraint set results in partitioning to form a well-conditioned sub-matrix with a reduced or minimized condition number, the linear program solution can be relatively stable. The present invention is a method to choose additional targets so that the active constraint set results in a reduced or minimized condition number of the relevant matrices.

Linear programs used for MPC can often be expressed in the form $$\min c^T x \quad (1)$$

such that $y = Kx + \varepsilon$; $y^{lo} \leq y \leq y^{up}$; and $x^{lo} \leq x \leq x^{up}$.

In Equation (1), x is a vector of independent variables, y is a vector of dependent variables, c is a vector of costs, K is a matrix, and $\varepsilon$ is a vector of parameters. In model predictive control, the matrix K is referred to as the gain matrix. The gain matrix, as defined herein, models how moves in the manipulated variables and disturbance variables affect the controlled variables at steady-state. The vector c is referred to as the bias, which is used to reduce plant-model mismatch. When new plant measurements become available (such as once per minute), the bias is updated and a new LP is solved.

The LP is considered to be stable if small changes in c do not result in significant changes in the LP solutions. If the LP is unstable, then small changes in c can result in drastically different solutions, often causing different constraint sets to be activated.

When the LP is solved, the constraint set is specified and the matrix K can be partitioned according to constrained and unconstrained variables, as shown in Equation (2).

$$\begin{bmatrix} y^C \\ y^U \end{bmatrix} = \begin{bmatrix} A & B \\ C & D \end{bmatrix} \begin{bmatrix} x^U \\ x^C \end{bmatrix} + \begin{bmatrix} \varepsilon^C \\ \varepsilon^U \end{bmatrix} \quad (2)$$

In Equation (2), $x^C$ and $y^C$ are the constrained variables (variables at either their upper or lower bounds), $x^U$ and $y^U$ are the unconstrained variables, and $\varepsilon^U$ and $\varepsilon^C$ are the biases corresponding to the unconstrained and constrained dependent variables, respectively. The partitioning shown in Equation (2) results in formation of sub-matrix A (along with sub-matrices B, C, and D). Based on the partition shown in Equation (2), sub-matrix A corresponds to the unconstrained independent variables and the constrained dependent variables.

For a LP with N independent variables, the solution will have N active constraints. Because the number of active constraints will match the number of independent variables, the sub-matrix A is square and a matrix pivot, as shown in Equation (3), can be used to calculate the values of the unconstrained variables given the constrained variables.

$$\begin{bmatrix} x^U \\ y^U \end{bmatrix} = \begin{bmatrix} A^{-1} & -A^{-1}B \\ CA^{-1} & D - CA^{-1}B \end{bmatrix} \begin{bmatrix} y^C - \varepsilon^C \\ x^C \end{bmatrix} + \begin{bmatrix} 0 \\ \varepsilon^U \end{bmatrix} \quad (3)$$

It is noted that the physical system underlying the LP may not suggest/require sufficient active constraints to match the N independent variables, thus making it necessary to select additional variables to achieve N active constraints. In various aspects, systems and methods are provided for selecting the additional variables using external targets, in order to form a sub-matrix A that has a reduced or minimized condition number. A matrix with a sufficiently low condition number can be considered "well-conditioned", while a matrix with a high condition number may correspond to a "poorly conditioned" matrix. If the sub-matrix A is poorly-conditioned, the matrix inverse $A^{-1}$ will amplify small perturbations in the bias $\varepsilon^C$ into large moves in the unconstrained variables $x^U$ and $y^U$. If the perturbations are sufficiently large, the LP solutions may alternate between different constraint sets. Thus the sub-matrix A (and the corresponding constraint set) can directly affect the stability of the LP, as the choice of constraint set may alter whether the partitioning results in a well-conditioned sub-matrix A or a poorly-conditioned sub-matrix A. It is noted that one-sided ETs and ET ranges can also be utilized, if desired.

When multiple layers of optimization are interfaced together, an external target (ET) on a variable is passed down to the LP as a constraint. Equations (4) and (5) show examples of constraints based on external targets for either dependent or independent variables.

$$y^{ET} = y^{up} = y^{lo} \quad (4)$$

$$x^{ET} = x^{up} = x^{lo} \quad (5)$$

In this discussion, the condition number for a matrix corresponds to the standard mathematical definition for a condition number. Any convenient method can be used for calculation of the condition number of a matrix, so long as the same method is used consistently during a given iteration of calculating and comparing condition numbers. Optionally, a threshold value can be set when evaluating various condition numbers to determine a variable for constraint. In such optional aspects, when condition numbers are determined based on constraint of available dependent variables, all condition numbers may be greater than the threshold value. If this occurs, it may be beneficial to not select an additional dependent variable for constraint. Instead, condition numbers can be determined for constraint of available independent variables, and the independent variable resulting in the minimum condition number can be selected for constraint.

Example of Methodology for Selecting Constraints: Shadow Values to Determine Costs Optimization programs often have some type of sensitivity analysis capability built into the software. A shadow value quantifies in the economic objective function with respect to changes in the value of a constraint. Shadow values are the result of the model, the state of the process, and the economic objective function. Shadow values can be calculated for any constrained variable in an optimization program. Shadow values can potentially be used directly as costs, or the shadow values can translated/modified to determine costs. As an example, the cost for an independent variable could be calculated by using its shadow value and the gain for each dependent variable multiplied by the corresponding shadow value. More generally, the upper optimization layer's shadow values and the linear program layer's model gain values can be used to determine costs for use by the linear program.

U.S. Pat. No. 8,620,705 provides an example of how shadow values can be calculated in an upper optimization layer (corresponding to an RTO layer) and translated/modified into costs for an underlying layer (corresponding to an MPC layer) based on a linear program (LP). Because the upper layer may be a nonlinear optimization problem, the shadow values may correspond to a non-square constraint set. A non-square constraint set means that there are more unconstrained independent variables than constrained dependent variables, such that the sub-matrix A is non-square. If the LP is solved using the costs in such an aspect, then the LP solution will move to a vertex away from the solution identified by the upper layer of optimization. External targets (ETs) can be used to add constraints to the LP such that the solution vertex and the solution from the upper optimization layer are consistent. The external targets can be used to either constrain dependent variables, thereby adding rows to the matrix A, or constrain independent variables, thereby removing columns from the matrix A.

In some aspects, such as automation applications, it can be beneficial to constrain the dependent variables y rather than the independent variables x. This can allow the controller a greater range in the manipulated variables so it can respond to disturbances and target changes. Furthermore, many MPC platforms typically treat constraints on dependent variables y as soft constraints, which can be violated if the LP is infeasible.

In various aspects, constraints can be selected using the following type of strategy:

(A) Set LP costs using shadow values from the upper layer of optimization, such as based on shadow values as described in U.S. Pat. No. 8,620,705 (incorporated herein by reference for limited purpose of providing a method for calculation of shadow values). Alternatively, costs can be set by any other convenient method.

(B) Analyze the constraint set from the upper layer of optimization. If the constraint set is square (i.e., there are the same number of unconstrained independent variables and constrained dependent variables), then stop.

(C) If the constraint set is not square, use external targets to make the optimization problem consistent between the upper and lower level. This can convert the non-square constraint set (and the corresponding non-square sub-matrix) into a square constraint set/sub-matrix A. As an initial step, it can be beneficial to set targets on the dependent variables thereby adding rows to the sub-matrix A. For each unconstrained dependent variable, take the following actions: constrain the variable, calculate and record the condition number of the candidate sub-matrix A, unconstrain the variable and move on to the next one. Once the full list of candidate condition numbers has been generated, select the minimum condition number and constrain the corresponding dependent variable. The constraint on the variable can correspond to, for example, the current value of the dependent variable.

(D) Repeat step (C) until the sub-matrix A is square or a user defined condition number tolerance is exceeded. If the condition number tolerance is exceeded, then independent variables need to be constrained to remove columns from the sub-matrix A and lower its condition number. A similar process to step (C) can be followed for setting targets on independent variables. For each unconstrained independent variable take the following actions: constrain the variable, calculate and record the condition number of the candidate sub-matrix A, unconstrain the variable and move on to the next one. The independent variable that yields the matrix A with minimum condition number can then be constrained. Continue with additional iterations until the sub-matrix A is square.

The sequential selection of external targets does not guarantee the overall minimum condition number for the sub-matrix A. However, the method described herein can provide an increased likelihood of selecting constraints that will result in a sub-matrix A that is well-conditioned. In some alternative aspects, a true minimum for the condition number could be determined by calculating a condition number for each possible combination of external targets. Unfortunately, the number of combinations is often quite large, making direct enumeration expensive. In such alternative aspects, it may be more efficient to solve a Knapsack-like integer program.

In some aspects, the above method can be employed when the desired constraint set is known a priori and setting targets on variables will affect the constraint set in a known way. The above algorithm provides a method for specifying a LP constraint set for increased or maximized stability and overriding a constraint set found in the linear program. One may wish to override a constraint set when LP costs alone are insufficient to find a desired solution. The method can also be applied to nonlinear optimization problems, after optional modification to consider the matrices inverted during the search for an optimized solution for the nonlinear problem.

Optionally but preferably, after converting the sub-matrix A to a square sub-matrix, the resulting sub-matrix can correspond to at least a 2×2 matrix, such as a 2×2 matrix, or a 3×3 matrix, or possibly a still larger sub-matrix.

Figure 2:
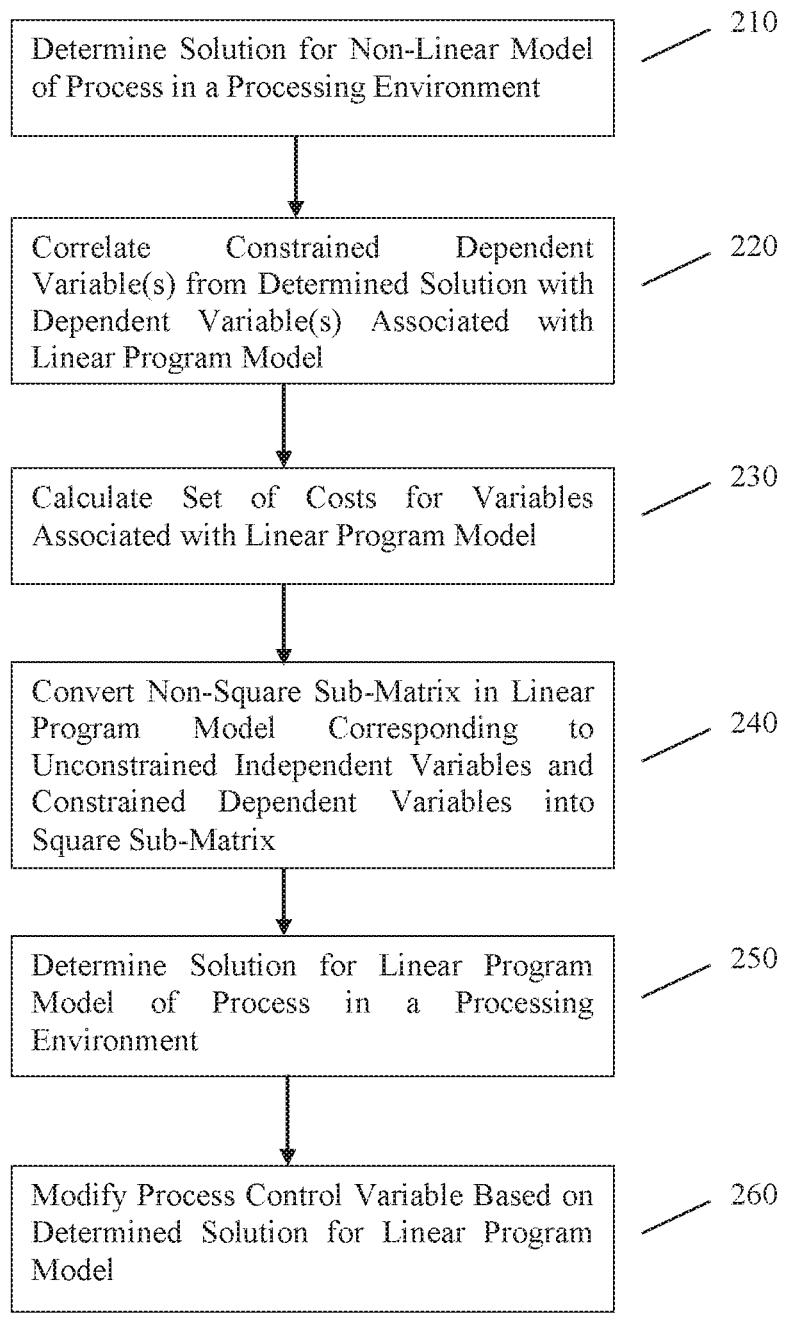
FIG. 2 shows a process flow for improving the stability between model layers used for control of a process in a processing environment.

FIG. 2 shows an example of how the constraint selection strategy described above can be used as part of an automated control system for controlling one or more processes in a processing environment. In FIG. 2, a solution is determined 210 for a non-linear model. The non-linear model corresponds to a higher model level, such as a Real-Time Optimization model. The determined solution can include at least one dependent variable that is constrained in the determined solution and a plurality of unconstrained independent variables. The independent variables can correspond to process control variables in the corresponding process that can be directly manipulated.

Based on the determined solution, the at least one dependent variable that is constrained can be correlated 220 with at least one dependent variable from a second set of dependent variables associated with a linear program model of the at least one process. The linear program model can correspond to, for example, a Model Predictive Control model. If the first set of dependent variables and the second set of dependent variables are the same, the correlation can be trivial, as there will be a one-to-one correspondence of variables between the first set of dependent variables and the second set of dependent variables. However, it is not required that the dependent variables from the non-linear model match the dependent variables from the linear program model. When the dependent variables from the models do not fully match, any convenient method can be used to correlate a constrained dependent variable from the non-linear model with a dependent variable from the linear program model. An example of a suitable correlation method can be the dot product similarity described in U.S. Pat. No. 8,620,705.

A set of costs 230 can also be calculated for the second set of dependent variables and the first set of independent variables (i.e., costs associated with variables for the linear program model). In some aspects, the calculated costs 230 can correspond to shadow values and/or other values based on the determined solution to the non-linear model. When the second set of dependent variables does not fully match the first set of dependent variables, the costs can optionally correspond to costs associated with the first set of dependent variables that are scaled based on correlations between the first set of dependent variables and the second set of dependent variables. More generally, any convenient method for determining a set of costs can be used.

Based on the plurality of unconstrained independent variables and the correlated at least one dependent variable, a gain matrix associated with the linear program model can be partitioned to form a non-square sub-matrix corresponding to the plurality of unconstrained independent variables and the (constrained) correlated at least one dependent variable. The non-square sub-matrix can then be converted 240 into a square sub-matrix using an iterative process so that the additional constraints added to the linear program model to allow solution result in a reduced or minimized condition number for the converted sub-matrix. The iterative process can include determining condition numbers for candidate sub-matrices based on constraint of each of the one or more unconstrained dependent variables. The iterative process can further include selecting a variable for constraint based on the lowest condition number from the group of determined condition numbers. This iterative process can continue until the sub-matrix is converted into a square sub-matrix, based on addition of rows (from adding constraints to dependent variables) or removal of columns (from adding constraints to independent variables).

Based on the converted sub-matrix, which is now square, and the calculated costs, the linear program model can be solved 250. Based on the solution for the linear program model, a process control variable can be modified 260. The process control variable can correspond to at least one unconstrained independent variable from the linear program model.

It is noted that the variable selected for constraint during the iterative process may not be the variable that corresponds to the lowest determined condition number. For example, if the lowest determined condition number is greater than a threshold value, then a second iterative process can be started to determine condition numbers for sub-matrices formed based on constraint of the unconstrained independent variables. The lowest condition number determined based on the unconstrained independent variables can then be selected for constraint.

Integration with Processing Environment

Various functions described herein can be performed/carried out by hardware, firmware, and/or software. For instance, various functions may be carried out by a processor executing instructions stored in memory.

Figure 3:
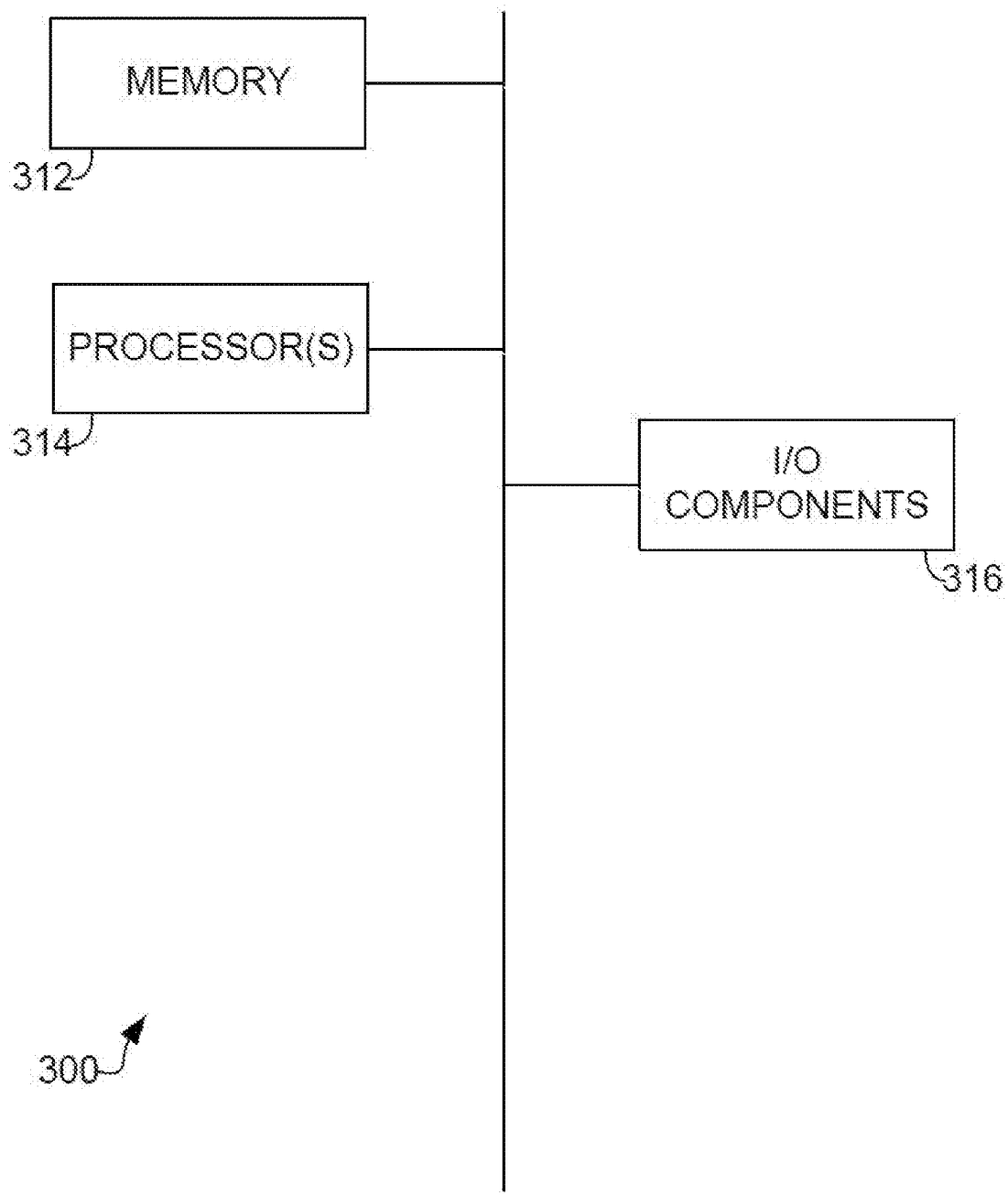
FIG. 3 schematically shows an example of a computing device.

An exemplary operating environment in which the non-linear model and/or linear program model may be implemented is described below. Such an operating environment can generally be referred to as a computing device, such as the computing device 300 that is schematically illustrated in FIG. 3. The computing device 300 is intended to be illustrative only, and should not be interpreted as having any dependency or requirement relating to any one or combination of components illustrated.

The models may be described in the general context of computer code or machine-useable instructions, including computer-executable instructions such as program modules. Generally, program modules including routines, programs, objects, components, data structures, etc. refer to code that perform particular tasks or implement particular abstract data types. The invention may be practiced in any convenient computing environment, such as a stand-alone computing environment, a hand-held computing environment, and/or a distributed computing environment where tasks are performed by remote-processing devices that are linked through a communications network.

With reference to FIG. 3, computing device 300 can include one or more processors 314 and an associated memory 312. Optionally, the computing device 300 can further include typical features associated with a computing devices, which can generally be referred to as input/output components 316. Input/output components 316 can include components for presenting data/images, components for entering data (such as a touch screen and/or keyboard), and ports for connection with other computing devices.

Computing device 300 typically includes a variety of computer-readable media. Computer-readable media can be any available media that can be accessed by computing device 300 and includes both volatile and nonvolatile media, removable and non-removable media. In some aspects, the computer-readable media can include volatile and nonvolatile, removable and non-removable media implemented in any method or technology for storage of information such as computer-readable instructions, data structures, program modules or other data. For example, computer-readable media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Additionally or alternately, computer-readable media can correspond to non-transitory computer-readable media and/or can correspond to media that excludes signals per se.

Memory 312 includes computer storage media in the form of volatile and/or nonvolatile memory. The memory may be removable, non-removable, or a combination thereof. Exemplary hardware devices include solid-state memory, hard drives, optical-disc drives, etc. Computing device 300 includes one or more processors that read data from various entities such as memory 312 or I/O components 316.

Example

In this example model predictive control (MPC) and real-time optimization (RTO) are used to control and optimize operation of a distillation column. The RTO application uses a sophisticated, sequential quadratic program (SQP) optimizer to find a global optimum operating point for the process. The optimum from the SQP can be against process constraints, or at peak optimum points between constraints, where the objective function loses profitability moving in either direction. The MPC has a simpler linear program (LP) optimizer, which is good for pushing the process against constraints, but is unable to recognize or stop at peak optima.

For convenience of explanation, in this example the MPC and the RTO have identical scope, so that they cover the same manipulated and controlled variables and have identical constraints on these variables. In other aspects, some variables present in the MPC (RIO) may not be present in the RIO (MPC). In such aspects, the method below may identify a variable for constraint that exists in the RTO but not in the MPC. In such aspects, a similarity method (such as the similarity method described in U.S. Pat. No. 8,620,705 based on dot product similarities) may be used to identify a dependent variable in the MPC for constraint.

The gain matrix for the MPC is shown in Table 1 (transposed for convenience). The manipulated variables are shown on the left. The controlled variables are shown on top.

TABLE 1

| | Gain matrix from the model predictive controller | | | | | | |
|---|---|---|---|---|---|---|---|
| MPC Gains | Steam Valve | Pump Amp | Pressure Valve | Bottom Impurity | Top Impurity | Tower DP | Top Tray Temp |
| Feed Flow | 0.1509 | 0.0297 | 0.1484 | 0.02 | 0.1839 | 0.1119 | 0.0882 |
| Reflux | −0.3214 | −0.0607 | −0.281 | −0.04 | −0.3601 | −0.2339 | −0.1909 |
| Column Pressure | 0 | 0.3007 | 0 | 0.22 | 1.9966 | 1.2747 | 0 |
| Bottom Temp | 3.983 | 0.686 | 3.5765 | 0.5 | 4.5283 | 2.8755 | 2.4495 |

The RTO contains an economic objective function and a complex set of non-linear equations which model the steady-state operation of the tower. The RTO identifies the solution seen in Table 2, where only two variables are constrained: Column Pressure and Bottom Impurity. The constrained variables are indicated by the "**" symbol in Table 2, MV corresponds to "Manipulated Variable" (i.e., independent variable), while CV corresponds to "Controlled Variable" (i.e., dependent variable).

TABLE 2

| MPC/RTO Variable Constraints | | | | | |
|---|---|---|---|---|---|
| Variable | Type | High Limit | Low Limit | RTO Target | RTO Shadow Value |
| Feed Flow | MV | 150 | 20 | 122 | 0 |
| Reflux | MV | 150 | 90 | 93.1 | 0 |

TABLE 2-continued

| MPC/RTO Variable Constraints | | | | | |
|---|---|---|---|---|---|
| Variable | Type | High Limit | Low Limit | RTO Target | RTO Shadow Value |
| Column Pressure | MV | **30 | 14.7 | **30 | 12.43 |
| Bottom Temp | MV | 30 | 10 | 21.2 | 0 |
| Steam Valve | CV | 100 | 0 | 45.3 | 0 |
| Pump Amp | CV | 20 | 4 | 12.61 | 0 |
| Pressure Valve | CV | 40 | 0 | 20.1 | 0 |
| Bottom Impurity | CV | **9.5 | 0.5 | **9.5 | 5.62 |
| Top Impurity | CV | 90 | 0.5 | 77.1 | 0 |
| Tower DP | CV | 100 | 1 | 47.2 | 0 |
| Top Tray Temp | CV | 20 | 10 | 15.6 | 0 |

The LP costs can be calculated, for example, using RTO shadow values such as the shadow values described above and further discussed in U.S. Pat. No. 8,620,705. The LP costs, shown in Table 3, can drive the MPC's LP to a constraint set consistent with the RTO. However, the RTO solution is not square so that the number of unconstrained manipulated variables (MVs) is not equal to the number of constrained controlled variables (CVs). This arises due to the non-linearity in the RTO model. For an LP, the solution be square (the number of constraints equals the total number of independent variables). Thus, if one were to use the LP costs in Table 3 alone, MPC's LP would correctly constrain Column Pressure and Bottom Impurity, but would also constrain other variables that are unconstrained in the RTO. To make the LP and RTO solutions consistent, additional targets can be set in the LP.

TABLE 3

| MPC LP Costs calculated using shadow values from the RTO | |
|---|---|
| MV | Cost |
| Feed Flow | −0.112 |
| Reflux | 0.225 |
| Column Pressure | −13.7 |
| Bottom Temp | −2.81 |

In various aspects, the methods described herein allow for selection of targets that can increase or maximize the stability of the LP. The method can first partition the gain matrix according to the constraint set. The matrix A is a sub-matrix corresponding to the unconstrained MVs and the constrained CVs. Since a LP always finds a square constraint set, the matrix A is always square. However, the additional constraints that are selected to form such a square constraint set may vary. The method herein can allow for determination of external targets for the LP which can reduce or minimize the condition number of the sub-matrix A.

In this example, by using the RTO shadow values as the LP costs, the RTO constraint set can be activated such that the sub-matrix A corresponds to the gains in Table 4. As shown in Table 3, there are 4 independent (manipulated) variables, but one is constrained, so that there are 3 independent unconstrained variables. Also as shown in Table 3, there is one constrained dependent (controlled) variable. As a result, the initial form of matrix A is a 3×1 matrix.

TABLE 4

The candidate "A" matrix partitioned from the gain matrix based on the RTO constraint set

|  | Bottom Impurity |
| --- | --- |
| Feed Flow | 0.02 |
| Reflux | −0.04 |
| Bottom Temp | 0.5 |

The current candidate A matrix in this table is non-square, which is not to say that the LP would find a non-square constraint set. Rather, the constraint set found by the LP will at least include the variables constrained in the RTO and also other variables that are unconstrained in the RTO. Following step (C) of the method, the first controlled variable (CV), Steam Valve, can be constrained. The condition number for the candidate A matrix can then be calculated. After that, the CV can be unconstrained. Per step (C) this can be repeated with each controlled variable to develop a listing of matrix condition numbers. Table 5 shows the condition numbers calculated based on constraining each unconstrained CV from Table 2.

TABLE 5

Condition numbers for candidate A matrices with different constrained CVs

| Constrained CV | Condition Number |
| --- | --- |
| Steam Valve | 3652 |
| Pump Amp | 233 |
| Pressure Valve | 3541 |
| Top Impurity | 11863 |
| Tower DP | 3449 |
| Top Tray Temp | 1142 |

The minimum condition number shown in Table 5 corresponds to constraining the variable "Pump Amp". This is below the maximum condition number of 1000 for selecting a controlled variable for constraint, so Pump Amp can be selected as the target. Both the high and low limit for Pump Amp in the LP are set equal to the RTO value of 12.61. This converts Pump Amp into a constrained variable.

With Pump Amp constrained, the candidate A matrix has the corresponding Pump Amp gains appended to it, as shown in Table 6.

TABLE 6

Intermediate Candidate A Matrix

|  | Bottom Impurity | Pump Amp |
| --- | --- | --- |
| Feed Flow | 0.02 | 0.0297 |
| Reflux | −0.04 | −0.0607 |
| Bottom Temp | 0.5 | 0.686 |

The candidate A matrix shown in Table 6 is still not square, which means that the LP will constrain Bottom Impurity, Pump Amp, Column Pressure (independent variable), and at least one other variable. Thus, one more variable needs to be targeted so that the LP solution is consistent with the RTO solution. To identify a variable, once again condition numbers are determined for potential A matrices where one additional controlled variable is constrained. Table 7 shows this second group of condition numbers.

TABLE 7

Condition numbers for second group candidate A matrices with different constrained CVs

| Constrained CV | Condition Number |
| --- | --- |
| Steam Valve | 3867 |
| Pressure Valve | 4328 |
| Top Impurity | 12880 |
| Tower DP | 3770 |
| Top Tray Temp | 2552 |

All of the condition numbers in Table 7 are greater than the threshold value of 1000. As a result, adding a constraint to one of the CVs in Table 7 would be believed to not provide sufficient stability for the resulting LP solution. Based on all of the condition numbers being greater than the threshold, the method moves to step (D) for evaluation of adding a constraint to one of the manipulated variables. Adding a constraint to one of the MVs is a way to remove a row from the A matrix, which provides an alternative method for forming a square matrix. Each manipulated variable is constrained one at a time and condition numbers are determined. Table 8 shows the condition numbers from constraining the manipulated variables.

TABLE 8

Condition numbers from constraining MVs for the candidate A matrix

| Constrained MV | Condition Number |
| --- | --- |
| Feed Flow | 249 |
| Reflux | 639 |
| Bottom Temp | 253 |

As shown in Table 8, adding a constraint on Feed Flow provides the lowest condition number. By constraining the Feed Flow manipulated variable, the Feed Flow row is removed from the A matrix. This results in a square matrix for the A matrix, as shown in Table 9. By adding constraints to Pump Amp and Feed Flow, the RTO and LP will have the same constraints while providing a reduced or possibly minimized condition number for the resulting A matrix. This can result in an increased or maximized stability for the LP solution.

TABLE 9

Final A matrix

|  | Bottom Impurity | Pump Amp |
| --- | --- | --- |
| Reflux | −0.04 | −0.0607 |
| Bottom Temp | 0.5 | 0.686 |

ADDITIONAL EMBODIMENTS

Embodiment 1

A method for improving performance of a process in processing environment, comprising: determining a solution for a non-linear model comprising a first set of dependent variables and a first set of independent variables, the solution for the non-linear model comprising at least one constrained variable from the first set of dependent variables and a plurality of unconstrained independent variables from the first set of independent variables, the first set of independent variables corresponding to process control variables for at least one process in a processing environment; correlating at least one dependent variable from a second set of dependent variables with the at least one constrained variable from the solution for the non-linear model, the second set of dependent variables being associated with a linear program model corresponding to the at least one process in the processing environment; calculating a set of costs associated with a second set of dependent variables and the first set of independent variables; partitioning a gain matrix for the linear program model to form a non-square sub-matrix comprising the plurality of unconstrained independent variables and the correlated at least one dependent variable; converting the non-square sub-matrix into a square sub-matrix based on constraining one or more unconstrained dependent variables from the second set of dependent variables, the plurality of independent variables, or a combination thereof, the converting comprising: determining, for each of one or more unconstrained dependent variables from the second set of dependent variables, condition numbers for candidate sub-matrices, the determining comprising: constraining a selected dependent variable; calculating a condition number for the candidate sub-matrix comprising the constrained selected dependent variable; and unconstraining the selected dependent variable; selecting, based on a lowest determined condition number, a variable for constraint from the one or more unconstrained dependent variables and the plurality of unconstrained independent variables; and repeating the determining of condition numbers and the selecting of variables for constraint until the square sub-matrix is formed; solving the linear program model based on at least the calculated costs and the converted square sub-matrix; and modifying, based on the solving of the linear program model, a process control variable corresponding to at least one unconstrained independent variable from the plurality of unconstrained independent variables.

Embodiment 2

A system comprising a processor and associated memory containing computer-executable instructions that, when executed, provide a method according to Embodiment 1.

Embodiment 3

The method or system of any of the above embodiments, wherein the calculated cost values are calculated at least in part based on the determined solution for the non-linear model, the calculated costs optionally comprising shadow values from the non-linear model.

Embodiment 4

The method or system of any of the above embodiments, wherein the non-linear model comprises a Real-Time Optimization model; wherein the linear program model comprises a Model Predictive Control model; or a combination thereof.

Embodiment 5

The method or system of any of the above embodiments, wherein selecting a variable for constraint based on the lowest determined condition number comprises selecting an unconstrained dependent variable corresponding to the lowest determined condition number.

Embodiment 6

The method or system of any of the above embodiments, wherein selecting a variable for constraint based on the lowest determined condition number comprises: comparing the lowest determined condition number with a threshold value; and selecting, based on the lowest determined condition number being greater than the threshold value, the variable for constraint from the plurality of unconstrained independent variables.

Embodiment 7

The method or system of Embodiment 6, wherein selecting the variable for constraint from the plurality of unconstrained independent variables comprises: determining, for each of the plurality of unconstrained independent variables, condition numbers for candidate sub-matrices, the determining comprising: constraining a selected independent variable; calculating a condition number for the candidate sub-matrix comprising the constrained selected independent variable; and unconstraining the selected independent variable; analyzing the determined condition numbers for the unconstrained independent variables to identify a lowest condition number; and selecting for constraint an unconstrained independent variable corresponding to the identified lowest condition number.

Embodiment 8

The method or system of any of the above embodiments, wherein the square sub-matrix comprises at least a 2×2 sub-matrix.

Embodiment 9

The method or system of any of the above embodiments, wherein the first set of dependent variables is the same as the second set of dependent variables.

Embodiment 10

The method or system of any of the above embodiments, wherein the solution for the non-linear model further comprises at least one constrained independent variable from the first set of independent variables.

Embodiment 11

The method or system of any of the above embodiments, wherein the processing environment comprises a refinery processing environment, a chemicals production processing environment, or a combination thereof.

Embodiment 12

The method or system of any of the above embodiments, wherein the at least one process comprises a distillation column, a pressurized reactor, a thermal reactor, a catalytic reactor, or a combination thereof.

Embodiment 13

The method or system of any of the above embodiments, wherein the non-linear model comprises a higher optimization layer than the linear program model.

Embodiment 14

The method or system of any of the above embodiments, wherein the modifying of the process control variable comprises changing the process control variable to have a value closer to a value of a corresponding independent variable in the linear program model, or wherein the modifying of the process control variable comprises changing the process control variable to have a value equal to a value of a corresponding independent variable in the linear program model.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A system for improving performance of a process in a processing environment, comprising:
a processor and associated memory containing computer-executable instructions that, when executed, provide a method comprising:
determining a solution for a non-linear model comprising a first set of dependent variables and a first set of independent variables, the solution for the non-linear model comprising at least one constrained variable from the first set of dependent variables and a plurality of unconstrained independent variables from the first set of independent variables, the first set of independent variables corresponding to process control variables for at least one process in a processing environment,
wherein the processing environment comprises a refinery processing environment, a chemicals production processing environment, or a combination thereof,
wherein the at least one process comprises a distillation column, a pressurized reactor, a thermal reactor, a catalytic reactor, or a combination thereof;
correlating at least one dependent variable from a second set of dependent variables with the at least one constrained variable from the solution for the non-linear model, the second set of dependent variables being associated with a linear program model corresponding to the at least one process in the processing environment;
calculating a set of costs associated with the second set of dependent variables and the first set of independent variables;
partitioning a gain matrix for the linear program model to form a non-square sub-matrix comprising the plurality of unconstrained independent variables and the correlated at least one dependent variable;
converting the non-square sub-matrix into a square sub-matrix based on constraining one or more unconstrained dependent variables from the second set of dependent variables, the plurality of independent variables, or a combination thereof, the converting comprising:
determining, for each of the one or more unconstrained dependent variables from the second set of dependent variables, condition numbers for candidate sub-matrices, the determining comprising:
constraining a selected dependent variable;
calculating a condition number for the candidate sub-matrix comprising the constrained selected dependent variable; and
unconstraining the selected dependent variable;
selecting, based on a lowest determined condition number, a variable for constraint from the one or more unconstrained dependent variables and the plurality of unconstrained independent variables; and
repeating the determining of condition numbers and the selecting of variables for constraint until the square sub-matrix is formed;
solving the linear program model based on at least the calculated costs and the converted square sub-matrix; and
modifying, based on the solving of the linear program model, a process control variable corresponding to at least one unconstrained independent variable from the plurality of unconstrained independent variables to control one of the at least one process in the process environment.

2. The system of claim 1, wherein the calculated cost values are calculated at least in part based on the determined solution for the non-linear model, the calculated costs optionally comprising shadow values from the non-linear model.

3. The system of claim 1, wherein the non-linear model comprises a Real-Time Optimization model.

4. The system of claim 1, wherein the linear program model comprises a Model Predictive Control model.

5. The system of claim 1, wherein selecting a variable for constraint based on the lowest determined condition number comprises selecting an unconstrained dependent variable corresponding to the lowest determined condition number.

6. The system of claim 1, wherein selecting a variable for constraint based on the lowest determined condition number comprises:
comparing the lowest determined condition number with a threshold value; and
selecting, based on the lowest determined condition number being greater than the threshold value, the variable for constraint from the plurality of unconstrained independent variables.

7. The system of claim 6, wherein selecting the variable for constraint from the plurality of unconstrained independent variables comprises:

determining, for each of the plurality of unconstrained independent variables, condition numbers for candidate sub-matrices, the determining comprising:

constraining a selected independent variable;

calculating a condition number for the candidate sub-matrix comprising the constrained selected independent variable; and unconstraining the selected independent variable;

analyzing the determined condition numbers for the unconstrained independent variables to identify a lowest condition number; and selecting for constraint an unconstrained independent variable corresponding to the identified lowest condition number.

8. The system of claim 1, wherein the square sub-matrix comprises at least a 2×2 sub-matrix.

9. The system of claim 1, wherein the first set of dependent variables is the same as the second set of dependent variables.

10. The system of claim 1, wherein the solution for the non-linear model further comprises at least one constrained independent variable from the first set of independent variables.

11. The system of claim 1, wherein the non-linear model comprises a higher optimization layer than the linear program model.

12. A method for improving performance of a process in a processing environment, comprising:

determining a solution for a non-linear model comprising a first set of dependent variables and a first set of independent variables, the solution for the non-linear model comprising at least one constrained variable from the first set of dependent variables and a plurality of unconstrained independent variables from the first set of independent variables, the first set of independent variables corresponding to process control variables for at least one process in a processing environment, wherein the processing environment comprises a refinery processing environment, a chemicals production processing environment, or a combination thereof, wherein the at least one process comprises a distillation column, a pressurized reactor, a thermal reactor, a catalytic reactor, or a combination thereof;

correlating at least one dependent variable from a second set of dependent variables with the at least one constrained variable from the solution for the non-linear model, the second set of dependent variables being associated with a linear program model corresponding to the at least one process in the processing environment;

calculating a set of costs associated with the second set of dependent variables and the first set of independent variables;

partitioning a gain matrix for the linear program model to form a non-square sub-matrix comprising the plurality of unconstrained independent variables and the correlated at least one dependent variable;

converting the non-square sub-matrix into a square sub-matrix based on constraining one or more unconstrained dependent variables from the second set of dependent variables, the plurality of independent variables, or a combination thereof, the converting comprising:

determining, for each of the one or more unconstrained dependent variables from the second set of dependent variables, condition numbers for candidate sub-matrices, the determining comprising:

constraining a selected dependent variable;

calculating a condition number for the candidate sub-matrix comprising the constrained selected dependent variable; and unconstraining the selected dependent variable;

selecting, based on a lowest determined condition number, a variable for constraint from the one or more unconstrained dependent variables and the plurality of unconstrained independent variables; and repeating the determining of condition numbers and the selecting of variables for constraint until the square sub-matrix is formed;

solving the linear program model based on at least the calculated costs and the converted square sub-matrix; and modifying, based on the solving of the linear program model, a process control variable corresponding to at least one unconstrained independent variable from the plurality of unconstrained independent variables to control one of the at least one process in the process environment.

13. The method of claim 12, wherein the calculated cost values are calculated at least in part based on the determined solution for the non-linear model, the calculated costs optionally comprising shadow values from the non-linear model.

14. The method of claim 1, wherein selecting a variable for constraint based on the lowest determined condition number comprises selecting an unconstrained dependent variable corresponding to the lowest determined condition number.

15. The method of claim 1, wherein selecting a variable for constraint based on the lowest determined condition number comprises:

comparing the lowest determined condition number with a threshold value; and selecting, based on the lowest determined condition number being greater than the threshold value, the variable for constraint from the plurality of unconstrained independent variables.

16. The method of claim 15, wherein selecting the variable for constraint from the plurality of unconstrained independent variables comprises:

determining, for each of the plurality of unconstrained independent variables, condition numbers for candidate sub-matrices, the determining comprising:

constraining a selected independent variable;

calculating a condition number for the candidate sub-matrix comprising the constrained selected independent variable; and unconstraining the selected independent variable;

analyzing the determined condition numbers for the unconstrained independent variables to identify a lowest condition number; and selecting for constraint an unconstrained independent variable corresponding to the identified lowest condition number.

17. The method of claim 12, wherein the solution for the non-linear model further comprises at least one constrained independent variable from the first set of independent variables.

* * * * *